(12) United States Patent
Rajagopalan Mohan et al.

(10) Patent No.: US 12,539,053 B2
(45) Date of Patent: Feb. 3, 2026

(54) IMPEDANCE MANOMETRY DEVICE FOR QUANTIFIABLE DIAGNOSIS OF PELVIC PROLAPSE

(71) Applicant: Covidien LP, Mansfield, MA (US)

(72) Inventors: Arvind Rajagopalan Mohan, Dracut, MA (US); Nikolai D. Begg, Wellesley, MA (US)

(73) Assignee: Covidien LP, Mansfield, MA (US)

( * ) Notice: Subject to any disclaimer, the term of this patent is extended or adjusted under 35 U.S.C. 154(b) by 1013 days.

(21) Appl. No.: 17/682,365

(22) Filed: Feb. 28, 2022

(65) Prior Publication Data

US 2022/0386887 A1 Dec. 8, 2022

Related U.S. Application Data

(60) Provisional application No. 63/155,525, filed on Mar. 2, 2021.

(51) Int. Cl.
| | | |
|---|---|---|
| *A61B 5/03* | (2006.01) | |
| *A61B 5/00* | (2006.01) | |
| *A61B 5/0536* | (2021.01) | |
| *A61B 5/0538* | (2021.01) | |

(52) U.S. Cl.
CPC ............ *A61B 5/035* (2013.01); *A61B 5/0536* (2013.01); *A61B 5/0538* (2013.01); *A61B 5/6853* (2013.01); *A61B 5/7425* (2013.01)

(58) Field of Classification Search
CPC ..... A61B 5/035; A61B 5/0536; A61B 5/0538; A61B 5/6853; A61B 5/7425; A61B 5/1076; A61B 5/4337; A61B 5/6867; A61B 5/687; A61B 5/6873; A61B 5/6874; A61B 2562/0247; A61B 2562/043

See application file for complete search history.

(56) References Cited

U.S. PATENT DOCUMENTS

| | | |
|---|---|---|
| 3,938,521 A | 2/1976 | Ritota et al. |
| 7,717,312 B2 | 5/2010 | Beetel |
| 8,696,563 B2 | 4/2014 | Williams et al. |

(Continued)

FOREIGN PATENT DOCUMENTS

WO 2016025132 A1 2/2016

*Primary Examiner* — Tse W Chen
*Assistant Examiner* — Joseph A Tombers
(74) *Attorney, Agent, or Firm* — Carter, DeLuca & Farrel

(57) ABSTRACT

A system for diagnosing and quantifying an organ prolapse includes a first manometry catheter configured for insertion within a first organ of the pelvic floor. The first manometry catheter includes an inflatable balloon configured to support a series of first sensors disposed along a length thereof and operably coupled to an image display for displaying a first image thereon relating to the first organ. One or more additional manometry catheters are configured for insertion within one or more respective additional organs. The additional manometry catheters include inflatable balloons configured to support corresponding additional sensors along a length thereof. The additional sensors are operably coupled to the image display for displaying one or more additional images thereon relating to the one or more additional organs. The first image and the one or more additional images being simultaneously displayed on the image display for diagnostic and quantification purposes.

20 Claims, 4 Drawing Sheets

(56) References Cited

U.S. PATENT DOCUMENTS

| | | | |
|---|---|---|---|
| 2003/0178032 A1* | 9/2003 | Ingle | A61B 18/1485 606/41 |
| 2010/0312181 A1* | 12/2010 | O'Dea | A61B 5/6853 604/96.01 |
| 2011/0144510 A1* | 6/2011 | Ryu | A61B 5/1107 600/509 |
| 2012/0116416 A1 | 5/2012 | Neff et al. | |
| 2013/0138115 A1 | 5/2013 | Seckin | |
| 2014/0052018 A1 | 2/2014 | Hawkins | |
| 2014/0288486 A1 | 9/2014 | Hart et al. | |
| 2014/0330285 A1 | 11/2014 | Rosenblatt et al. | |
| 2015/0133923 A1 | 5/2015 | Batchelor et al. | |
| 2015/0272619 A1 | 10/2015 | Zisow | |
| 2015/0297254 A1 | 10/2015 | Sullivan et al. | |
| 2016/0302783 A1 | 10/2016 | Greenberg et al. | |
| 2022/0133166 A1* | 5/2022 | Ghodsian | A61B 5/435 600/304 |

\* cited by examiner

IMPEDANCE MANOMETRY DEVICE FOR QUANTIFIABLE DIAGNOSIS OF PELVIC PROLAPSE

CROSS-REFERENCE TO RELATED APPLICATION

This application claims the benefit of and priority to U.S. Provisional Patent Application No. 63/155,525 filed Mar. 2, 2021, the entire disclosure of which is incorporated by reference herein.

BACKGROUND

Technical Field

The present disclosure relates to surgical instruments used in various gynecological procedures and, more particularly, surgical instruments used for the diagnosing and quantifying pelvic prolapses.

Description of Related Art

Pelvic Organ Prolapse (POP) and other associated pelvic floor disorders are among the fastest growing health concerns worldwide and may affect upwards of 50% of all women who have given birth. POP is characterized by the loss of structural integrity of the supporting tissues (muscles, ligaments, tendons, etc.) within the female pelvis. As the support tissues weaken, pelvic organs (vagina, bladder, rectum, and bowel) begin to protrude into the vaginal canal and towards the vaginal opening. This leads to numerous complications including urinary and fecal incontinence, pain and ulcerations, sexual discomfort, and many psycho-social complications.

The most common cause of POP is childbirth due to a baby's head passing through the vaginal canal which results in the various pelvic tissues undergoing atypical conditions, e.g., stretching, pulling, abnormal pressure, and other potentially dangerous distortions. This can lead to many uncommon medical conditions such as: obstetric lacerations or tearing of tissues, nerve damage, obstruction of normal blood flow to vaginal tissues (e.g., temporary ischemic), and possible muscle trauma. These various distortions may be severe enough to cause POP symptoms shortly after childbirth or more commonly as a progressive degenerative disorder, e.g., muscle and nerve injuries sustained during childbirth may take years to reach a symptomatic level.

In particular, it is known that the atrophic weakening of muscles due to nerve damage leads to highly symptomatic POP where surgical intervention is likely. Other factors that increase risk for POP later in life include obesity, heavy-lifting, endurance or high-impact athletics, and other conditions which may greatly or repeatedly increase the patient's intra-abdominal pressure.

Since the underlying phenomenon of the POP is inherently mechanical or structural, the ability to evaluate the structure of the organs and tissues involved in POP is important to understanding, diagnosing, and treating this pathology. The most common diagnostic method for evaluating POP is a physical exam of the pelvis conducted by a physician or nurse along with the completion of a brief "scoring" system (the Pelvic Organ Prolapse Quantification system or POPQ) which stages the prolapse as grade 1-4. This system is quick and effective, but inherently subjective.

Other diagnostic techniques include urodynamics testing, which involves filling and draining of the urinary bladder while measuring certain diagnostic parameters. Vaginal manometry is another common technique, in which a balloon is inserted into the vagina and inflated while pressure is tracked. A similar technique to vaginal manometry is employed to evaluate the structural competency of the anus and rectum, called anorectal manometry (ARM). These techniques all seek to evaluate the way lumenal tissues respond to specific loading conditions.

Current in vivo biomechanics devices and methods limit the ability of surgeons and technicians to obtain accurate diagnostics and properly quantify the extent of POP in vaginal tissue.

SUMMARY

As used herein, the term "distal" refers to the portion that is being described which is further from a user, while the term "proximal" refers to the portion that is being described which is closer to a user.

Provided in accordance with one aspect of the present disclosure is a system for diagnosing and quantifying an organ prolapse which includes a first manometry catheter configured for insertion within a first organ of the pelvic floor. The first manometry catheter includes an inflatable balloon configured to support a series of first sensors disposed along a length thereof and operably coupled to an image display for displaying a first image thereon relating to the first organ. One or more additional manometry catheters are configured for insertion within one or more respective additional organs. The additional manometry catheters include inflatable balloons configured to support corresponding additional sensors along a length thereof. The additional sensors are operably coupled to the image display for displaying one or more additional images thereon relating to the one or more additional organs. The first image and the one or more additional images are simultaneously displayed on the image display for diagnostic and quantification purposes of the pelvic floor.

In aspects according to the present disclosure, the sensors of at least the first manometry catheter are impedance sensors. In other aspects according to the present disclosure, the first inflatable balloon and/or the inflatable balloon of the additional manometry catheter is inflatable using a conductive liquid. In yet other aspects according to the present disclosure, the first inflatable balloon is inflatable using a conductive liquid and the balloon of the one or more additional manometry catheters is inflatable using a second conductive liquid.

In aspects according to the present disclosure, the first inflatable balloon inflates to a first geometry and the inflatable balloon of the one or more additional manometry catheters inflates to a different geometry. In other aspects according to the present disclosure, the geometry of the first inflatable balloon and the geometry of the inflatable balloon of the one or more additional manometry catheters may vary according to tip diameter, overall diameter, diameter along a length of the respective balloon, maximum diameter along the length of the respective balloon, and/or length of the respective balloon.

In aspects according to the present disclosure, the series of first sensors are arranged in an alternating fashion on the anterior and posterior sides of the first inflatable balloon. In other aspects according to the present disclosure, the series of first sensors of the first catheter and the series of sensors of the one or more additional manometry catheters are arranged in an alternating fashion on the anterior and posterior sides of both the respective first inflatable balloon and the balloon of the one or more additional manometry catheters.

In aspects according to the present disclosure, the first catheter includes two or more inflatable balloons. In other aspects according to the present disclosure, a first inflatable balloon of the first catheter inflates to a first geometry and a second inflatable balloon of the first catheter inflates to a second geometry. In yet other aspects according to the present disclosure, a first inflatable balloon of the first catheter is configured to inflate to the anterior side of the pelvic floor and a second inflatable balloon of the first catheter is configured to inflate to a posterior side of the pelvic floor.

Provided in accordance with one aspect of the present disclosure is a system for diagnosing and quantifying an organ prolapse which includes a first manometry catheter configured for insertion within a first organ of the pelvic floor. The first manometry catheter including an inflatable balloon which is configured to support a series of first sensors disposed along a length thereof, the series of first sensors arranged in alternating order along the length of the inflatable balloon on anterior and posterior sides thereof. The first series of sensors are operably coupled to an image display for displaying a first image thereon relating to the first organ.

One or more additional manometry catheters is configured for insertion within one or more additional organs of the pelvic floor, the one or more additional catheters each including an inflatable balloon configured to support a series of additional sensors disposed along a length thereof. The series of additional sensors are arranged in alternating order along the length of the inflatable balloon of the one or more additional catheters on anterior and posterior sides thereof. The series of additional sensors are operably coupled to the image display for displaying one or more additional image thereon relating to the one or more additional organs. The first image and the one or more additional images are simultaneously displayed on the image display for diagnostic and quantification purposes on the pelvic floor.

In aspects according to the present disclosure, the sensors of at least the first manometry catheter are impedance sensors. In other aspects according to the present disclosure, the first inflatable balloon and/or the inflatable balloon of the additional manometry catheter is inflatable using a conductive liquid. In yet other aspects according to the present disclosure, the first inflatable balloon is inflatable using a conductive liquid and the balloon of the one or more additional manometry catheters is inflatable using a second conductive liquid.

In aspects according to the present disclosure, the first inflatable balloon inflates to a first geometry and the inflatable balloon of the one or more additional manometry catheters inflates to a different geometry. In other aspects according to the present disclosure, the geometry of the first inflatable balloon and the geometry of the inflatable balloon of the one or more additional manometry catheters may vary according to tip diameter, overall diameter, diameter along a length of the respective balloon, maximum diameter along the length of the respective balloon, and/or length of the respective balloon.

In aspects according to the present disclosure, the first catheter includes two or more inflatable balloons. In other aspects according to the present disclosure, a first inflatable balloon of the first catheter inflates to a first geometry and a second inflatable balloon of the first catheter inflates to a second geometry. In yet other aspects according to the present disclosure, a first inflatable balloon of the first catheter is configured to inflate to the anterior side of the pelvic floor and a second inflatable balloon of the first catheter is configured to inflate to a posterior side of the pelvic floor.

BRIEF DESCRIPTION OF THE DRAWINGS

Various aspects of the present disclosure are described herein with reference to the drawings wherein like reference numerals identify similar or identical elements.

DETAILED DESCRIPTION

Figure 1A:
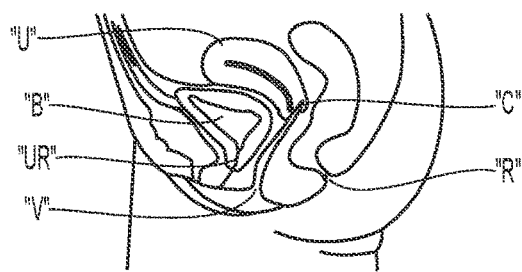
FIGS. 1A-1D are internal, schematic side views of a woman's pelvis showing varying types of prolapses.

Throughout the description, like reference numerals and letters indicate corresponding structure throughout the several views. Also, any particular feature(s) of a particular exemplary embodiment may be equally applied to any other exemplary embodiment(s) of this specification as suitable. In other words, features between the various exemplary embodiments described herein are interchangeable as suitable, and not exclusive.

Figure 1B:
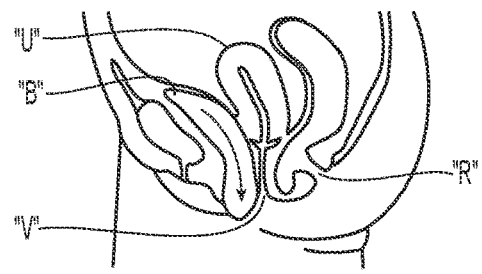
Figure 1C:
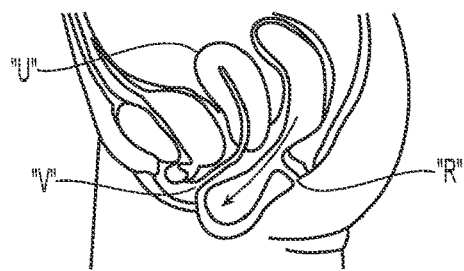
Figure 1D:
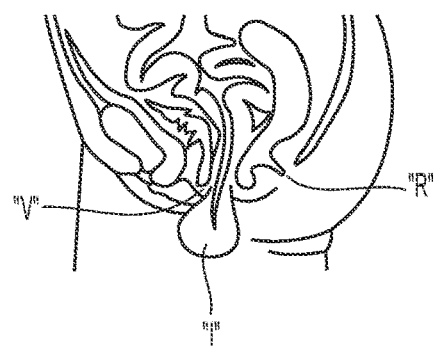

Referring initially to FIGS. 1A and 1D, various view of a woman's pelvic floor are shown highlighting common anatomical prolapses. FIG. 1A shows a typical pelvic floor while the remaining figures illustrate a range of anatomical defects associated with particular organ prolapses. For example, FIG. 1B illustrates a Cystocele or Anterior Vaginal Prolapse which is characterized in a weakened bladder "B" falling or encroaching into the vagina "V". A Cystocele occurs when ligaments that hold up a woman's bladder "B" and the muscle between a woman's vagina "V" and bladder "B" stretches or weakens, allowing the bladder "B" to sag into the vagina "V". Varying grades of a Cystocele can greatly affect a woman's lifestyle and typically range from a Grade 1 minimal encroachment into or proximate the vagina "V" or vaginal wall to a Grade 3 representing the full bulging of the bladder "B" into a women's vagina "V". This can lead to a feeling of a constant urge to urinate, UTIs and painful intercourse among other things.

FIG. 1C illustrates a second type of prolapse commonly referred to as Rectocele or Posterior Vaginal Prolapse. A Rectocele or Posterior Vaginal Prolapse occurs when the thin wall of tissue that separates the rectum "R" from the vagina "V" weakens, allowing the vaginal wall to bulge inwardly. If the prolapse is large, it may create a noticeable bulge of tissue through the vaginal opening and may lead to significant discomfort.

FIG. 1D illustrates a third type of prolapse commonly referred to as Enterocele or Small Bowel Prolapse. An Enterocele or Small Bowel Prolapse occurs when the small intestine "I" (small bowel) descends into the lower pelvic cavity and pushes at the top part of the vagina "V", creating a bulge therein. This type of prolapse tends to cause pelvic pain (especially when prone), lower back pain, vaginal discomfort, and dyspareunia (painful intercourse).

Other types of prolapses that are not illustrated herein but may benefit from the present disclosure discussed herein include Uterine Prolapses (e.g., prolapse of the uterus "UR" into the vagina "V") and Vaginal Wall Prolapses.

The current standard for diagnosing and quantifying prolapses is to use a series of manual tools and a ruler to measure the anatomic defect (e.g., the distance the vaginal apex has migrated into the vaginal canal compared to normal anatomical references for a baseline reference). Although objective, this method is complex thereby restricting this exercise to experts and is open to errors, e.g., visual (parallax) errors inherent with taking visual measurements. Moreover, this traditional method only provides a simplified or generalized output about the defect thus increasing the burden on surgical planning for potential treatment.

Figure 2:
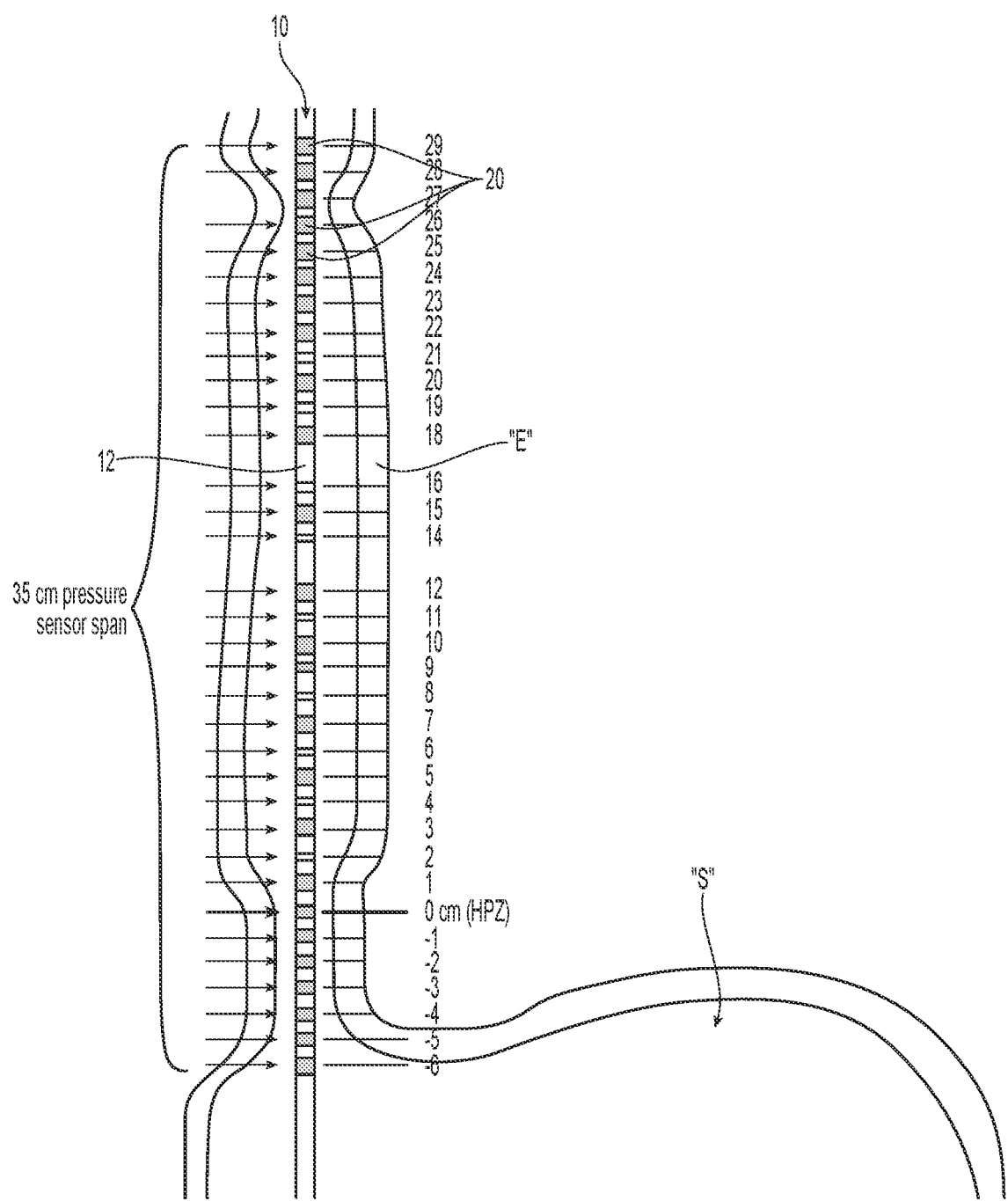
FIG. 2 is schematic diagram of an impedance manometry catheter with a series of pressure sensors disposed along a length thereof.

FIG. 2 shows a schematic illustration of a known impedance manometry catheter 10 for use in diagnosing the severity of esophageal disorders. For example, the EndoFLIP™ impedance planimetry system owned by Medtronic, is an advanced imaging technology that provides an internal view of the gastroesophageal junction during endoscopic procedures.

The EndoFLIP™ uses a balloon catheter 10 that is filled with a known liquid (e.g., saline) and includes a series of impedance sensors 20 disposed along the length of the catheter 10. The catheter 10 is inserted into the esophagus "E" and into the upper stomach "S" area. By measuring the values of the sensor 20 at each point, the manometry catheter 10 (along with a feedback control unit and display (not shown)) can compute the estimated diameter at each point thereby allowing the estimation of the catheter 10 and therefore esophagus "E" at each sensor 20 location for display. This enables a surgeon to receive real time feedback relating the pressure and dimensions of the esophagus "E" to identify and measure various motility disorders that are crucial to the planning of most esophageal surgeries.

Figure 3:
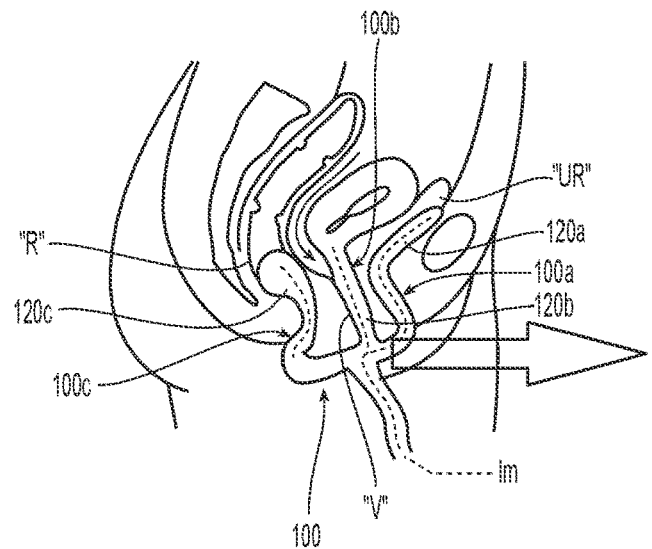
FIG. 3 is an internal, schematic, side view of a woman's pelvis having a plurality of impedance manometry balloon catheters disposed in various orifices associated with the pelvis.

FIG. 3 shows one embodiment of the multi-catheter system 100 for use with the present disclosure to provide proper and specific diagnosis and quantification of vaginal prolapses. More particularly, system 100 includes a series of impedance manometry balloon catheters 100a-100c that are each specifically designed for the particular organs of the pelvic floor, e.g., vaginal canal "V", urethral/bladder "UR" and anus/rectum "R" (See FIG. 1A). Each balloon catheter 100a-100c is specifically designed according to the anatomical geometry of the particular organ. For example, the balloons of each catheter 100-a-100c may be variable based upon: tip diameter; overall diameter; diameter along the length of the balloon, e.g., different maximums along the length of the balloon; length of each catheter; distance between each sensor (for higher resolution of image); and the type of conductive liquid used inside the balloon which directly corresponds to image resolution quality. Tip diameters (before inflation) may be in the range of about 2 mm for easy insertion into particular organs, e.g., vaginal canal, and smaller (e.g., less than 2 mm) for insertion into other organs, e.g., urethra. Maximum diameters of the balloons along the length of the catheter may range from about 2 cm to about 8 cm to suit different possible internal diameters of the various organs. The length of the catheter may be about 10 cm for each organ or in some instances longer or shorter depending upon patient anatomy.

FIG. 3 shows the catheters 100a-100c simultaneously disposed in the various organs, e.g., catheter 100a disposed in the urethra "UR", catheter 100b disposed in the vaginal canal "V", and catheter 100c disposed in the rectum "R". Combining the output of corresponding sensors 120a-120c of the multiple balloon catheters 100a-100c simultaneously disposed in different organs allows the surgeon to get a much better understanding of the overall anatomical defect or defects in a single image on an image display "IM". Moreover, in addition to capturing the anatomic defect or defects, a surgeon is able to estimate the radial force that is being applied at any given point by using computational techniques such as finite element analysis (FEA) or computational fluid dynamics (CFD) to get the characteristic curve between the radial forces and the diameter for the known fluid inside the catheter.

Figure 4A:
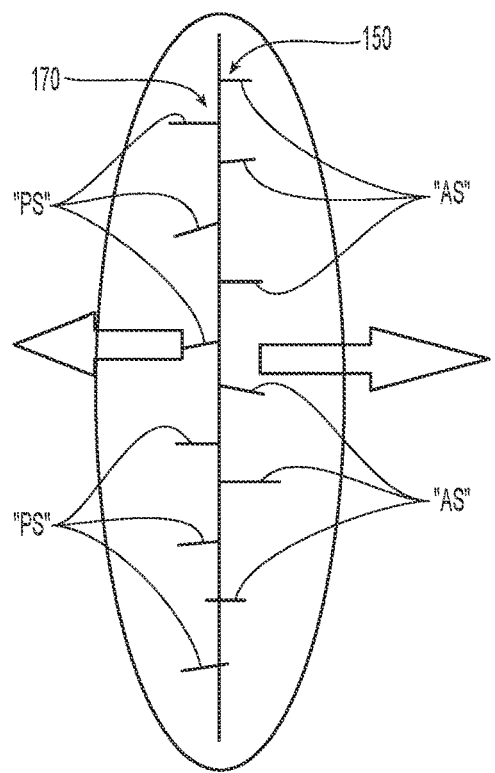
FIGS. 4A-4B are schematic side views of a varying pairs of impedance manometry balloon catheters oriented anteriorly and posteriorly and used in combination to capture anatomical defects.

FIG. 4A shows another embodiment of a balloon manometry catheter 150 which includes a series of sensors 170 arranged in alternating fashion on the sides of the catheter 150. For example, anterior sensors "AS" are arranged on the anterior side of the catheter 150 and posterior sensors "PS" are arranged on the posterior side of the catheter 150. When the surgeon or technician inserts the catheter 150 into the organ, e.g., vagina "V", careful attention is paid to orient the catheter 150 to the correct side of the patient body, anterior and posterior, which, in turn, orients the sensors "AS" and "PS" for measurement. Differentiating between anterior and posterior defects is advantageous and may play an important role during surgical planning. The sensors "AS" and "PS" may be alternated or grouped in any desirable fashion to produce a particular result.

Figure 4B:
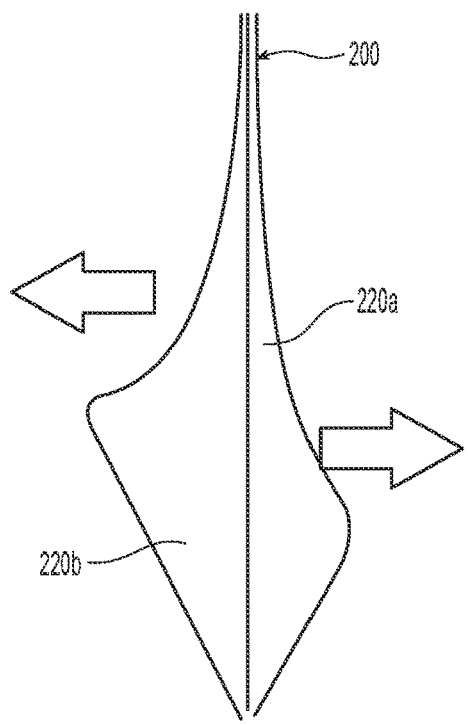

FIG. 4B shows another embodiment of a balloon manometry catheter 200 which includes two balloons 220a and 220b that are integrated into the catheter 200. Balloons 220a, 220b may be arranged on the posterior and anterior sides of the catheter 200. The balloons 220a, 220b may have different geometries, different diameters or a differing number of sensors (not shown) to facilitate differentiation of defects in different planes. When the surgeon or technician inserts the catheter 200 into the organ, e.g., vagina "V", careful attention is paid to orient the catheter 200 to the correct side of the patient body, anterior and posterior, which, in turn, orients the balloons 220a, 220b for diagnostics and measurement.

Figure 5A:
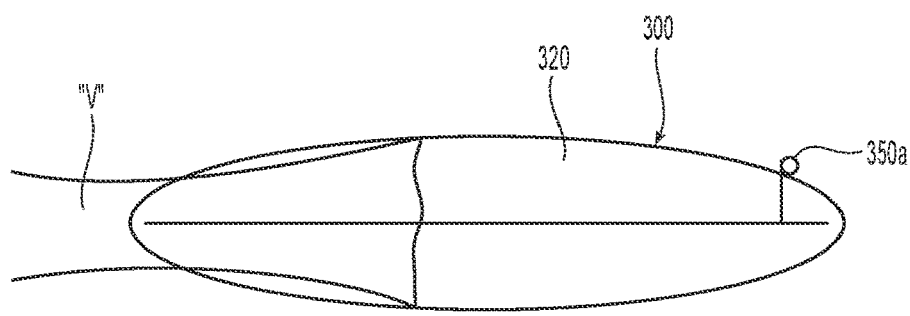
FIGS. 5A-5B are schematic side views of impedance manometry balloon catheters having one or more ball floats configured to map the inner peripheral surface of the balloon catheter within an organ.
Figure 5B:

FIGS. 5A and 5B show another embodiment of a balloon catheter 300 which includes a ball 350a, 350b that is configured to float or sink, respectively, relative to the balloon 320 protruding outside of the organ, e.g., vaginal canal, "V", which, in turn, may be referenced on the manometry image or image display "IM" and provide feedback relating to prolapses in one or more organs.

In embodiments, a series of positional sensors or accelerometers (not shown) may be used which are configured monitor their positions relative to one another which, in turn, may be referenced on the manometry image or image display "IM" to provide feedback relating to prolapses in one or more organs.

Moreover, and as mentioned above, in addition to capturing the anatomic defect or defects by any of the aforedescribed catheters and methods discussed herein, a surgeon may be able to estimate the radial force that is being applied at any given point by using computational techniques such as finite element analysis (FEA) or computational fluid dynamics (CFD) to get the characteristic curve between the radial forces and the diameter for the known fluid inside these various catheters.

The various embodiments disclosed herein may also be configured to work with robotic surgical systems and what is commonly referred to as "Telesurgery." Such systems employ various robotic elements to assist the clinician and allow remote operation (or partial remote operation) of surgical instrumentation. Various robotic arms, gears, cams, pulleys, electric and mechanical motors, etc. may be employed for this purpose and may be designed with a robotic surgical system to assist the clinician during the course of an operation or treatment. Such robotic systems may include remotely steerable systems, automatically flexible surgical systems, remotely flexible surgical systems, remotely articulating surgical systems, wireless surgical systems, modular or selectively configurable remotely operated surgical systems, etc.

The robotic surgical systems may be employed with one or more consoles that are next to the operating theater or located in a remote location. In this instance, one team of clinicians may prep the patient for surgery and configure the robotic surgical system with one or more of the instruments disclosed herein while another clinician (or group of clinicians) remotely controls the instruments via the robotic surgical system. As can be appreciated, a highly skilled clinician may perform multiple operations in multiple locations without leaving his/her remote console which can be both economically advantageous and a benefit to the patient or a series of patients.

For a detailed description of exemplary medical work stations and/or components thereof, reference may be made to U.S. Patent Application Publication No. 2012/0116416, and PCT Application Publication No. WO2016/025132, the entire contents of each of which are incorporated by reference herein.

Persons skilled in the art will understand that the structures and methods specifically described herein and shown in the accompanying figures are non-limiting exemplary embodiments, and that the description, disclosure, and figures should be construed merely as exemplary of particular embodiments. It is to be understood, therefore, that the present disclosure is not limited to the precise embodiments described, and that various other changes and modifications may be affected by one skilled in the art without departing from the scope or spirit of the disclosure. Additionally, the elements and features shown or described in connection with certain embodiments may be combined with the elements and features of certain other embodiments without departing from the scope of the present disclosure, and that such modifications and variations are also included within the scope of the present disclosure. Accordingly, the subject matter of the present disclosure is not limited by what has been particularly shown and described.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto. For example, the knife body and tube do not necessarily have to be made from the exact same materials. Similar materials, or any two materials that can be welded together to allow for a durable weld joint could be used.

What is claimed is:

1. A system for diagnosing and quantifying an organ prolapse, comprising:
    a first manometry catheter configured for insertion within a first organ of the pelvic floor, the first manometry catheter including a first inflatable balloon configured to support a series of first sensors disposed along a length thereof, the series of first sensors operably coupled to an image display for displaying a first image thereon relating to the first organ; and
    at least one additional manometry catheter configured for insertion within at least one additional organ of the pelvic floor, the at least one additional manometry catheter including a second inflatable balloon configured to support a series of additional sensors disposed along a length thereof, the series of additional sensors operably coupled to the image display for displaying at least one additional image thereon relating to the at least one additional organ,
    wherein the system is configured to simultaneously combine an output of the series of first sensors of the first manometry catheter and the at least one additional manometry catheter to display an overall anatomical defect in a single image on the image display and the system further configured to estimate radial force being applied at any given point along each respective catheter using one or more computation techniques to get a characteristic curve between the radial force and a diameter inside each respective catheter for a known fluid.

2. The system for diagnosing and quantifying an organ prolapse according to claim 1, wherein the sensors of at least the first manometry catheter are impedance sensors.

3. The system for diagnosing and quantifying an organ prolapse according to claim 1, wherein at least the first inflatable balloon is inflatable using a conductive liquid.

4. The system for diagnosing and quantifying an organ prolapse according to claim 1, wherein the first inflatable balloon is inflatable using a conductive liquid and the second inflatable balloon of the at least one additional manometry catheter is inflatable using a second conductive liquid.

5. The system for diagnosing and quantifying an organ prolapse according to claim 1, wherein the first inflatable balloon inflates to a first geometry and the second inflatable balloon of the at least one additional manometry catheter inflates to a different geometry.

6. The system for diagnosing and quantifying an organ prolapse according to claim 1, wherein the geometry of the first inflatable balloon and the geometry of the second inflatable balloon of the at least one additional manometry catheter varies according to at least one of tip diameter, overall diameter, diameter along a length of the respective balloon, maximum diameter along the length of the respective balloon, and length of the respective balloon.

7. The system for diagnosing and quantifying an organ prolapse according to claim 1, wherein the series of first sensors are arranged in an alternating fashion on the anterior and posterior sides of the first inflatable balloon.

8. The system for diagnosing and quantifying an organ prolapse according to claim 1, wherein the series of first sensors of the first catheter and the series of additional sensors of the at least one additional manometry catheter are arranged in an alternating fashion on the anterior and posterior sides of both the respective first inflatable balloon and the second inflatable balloon of the at least one additional manometry catheter.

9. The system for diagnosing and quantifying an organ prolapse according to claim 1, wherein the first catheter includes at least two inflatable balloons.

10. The system for diagnosing and quantifying an organ prolapse according to claim 9, wherein a first inflatable balloon of the first catheter inflates to a first geometry and a second inflatable balloon of the first catheter inflates to a second geometry.

11. The system for diagnosing and quantifying an organ prolapse according to claim 9, wherein a first inflatable balloon of the first catheter is configured to inflate to the anterior side of the pelvic floor and a second inflatable balloon of the first catheter is configured to inflate to a posterior side of the pelvic floor.

12. A system for diagnosing and quantifying an organ prolapse, comprising:
   a first manometry catheter configured for insertion within a first organ of the pelvic floor, the first manometry catheter including a first inflatable balloon configured to support a series of first sensors disposed along a length thereof, the series of first sensors arranged in alternating order along the length of the first inflatable balloon on anterior and posterior sides thereof, the series of first sensors operably coupled to an image display for displaying a first image thereon relating to the first organ; and
   at least one additional manometry catheter configured for insertion within at least one additional organ of the pelvic floor, the at least one additional manometry catheter including a second inflatable balloon configured to support a series of additional sensors disposed along a length thereof, the series of additional sensors arranged in alternating order along the length of the second inflatable balloon of the at least one additional catheter on anterior and posterior sides thereof, the series of additional sensors operably coupled to the image display for displaying at least one additional image thereon relating to the at least one additional organ, the first image and the at least one additional image being simultaneously displayed on the image display for diagnostic and quantification purposes,
   wherein the system is configured to simultaneously combine an output of the series of first sensors of the first manometry catheter and the at least one additional manometry catheter to display an overall anatomical defect in a single image on the image display and the system further configured to estimate radial force being applied at any given point along each respective catheter using one or more computation techniques to get a characteristic curve between the radial force and a diameter inside each respective catheter for a known fluid.

13. The system for diagnosing and quantifying an organ prolapse according to claim 12, wherein the sensors of at least the first manometry catheter are impedance sensors.

14. The system for diagnosing and quantifying an organ prolapse according to claim 12, wherein at least the first inflatable balloon is inflatable using a conductive liquid.

15. The system for diagnosing and quantifying an organ prolapse according to claim 12, wherein the first inflatable balloon is inflatable using a conductive liquid and the second inflatable balloon of the at least one additional manometry catheter is inflatable using a second conductive liquid.

16. The system for diagnosing and quantifying an organ prolapse according to claim 12, wherein the first inflatable balloon inflates to a first geometry and the second inflatable balloon of the at least one additional manometry catheter inflates to a different geometry.

17. The system for diagnosing and quantifying an organ prolapse according to claim 12, wherein the geometry of the first inflatable balloon and the geometry of the second inflatable balloon of the at least one additional manometry catheter varies according to at least one of tip diameter, overall diameter, diameter along a length of the respective balloon, maximum diameter along the length of the respective balloon, and length of the respective balloon.

18. The system for diagnosing and quantifying an organ prolapse according to claim 12, wherein the first catheter includes at least two inflatable balloons.

19. The system for diagnosing and quantifying an organ prolapse according to claim 18, wherein a first inflatable balloon of the first catheter inflates to a first geometry and a second inflatable balloon of the first catheter inflates to a second geometry.

20. The system for diagnosing and quantifying an organ prolapse according to claim 18, wherein a first inflatable balloon of the first catheter is configured to inflate to the anterior side of the pelvic floor and a second inflatable balloon of the first catheter is configured to inflate to a posterior side of the pelvic floor.

* * * * *